United States Patent [19]

Alfes et al.

[11] 4,238,351

[45] Dec. 9, 1980

[54] POLYARYLAMIDE, THEIR PRODUCTION AND THEIR USE AS ABSORBERS FOR ULTRAVIOLET RAYS

[75] Inventors: Franz Alfes, Krefeld; Wolfgang Jacob, Moers; Karl-Heinrich Meyer; Ludwig Bottenbruch, both of Krefeld, all of Fed. Rep. of Germany

[73] Assignee: Bayer Aktiengesellschaft, Fed. Rep. of Germany

[21] Appl. No.: 675,738

[22] Filed: Apr. 12, 1976

[30] Foreign Application Priority Data

Apr. 16, 1975 [DE] Fed. Rep. of Germany ....... 2516684

[51] Int. Cl.³ .............................................. C09K 15/22
[52] U.S. Cl. .................................... 252/403; 252/300; 560/48; 260/45.85 A; 260/45.85 N; 260/45.9 R
[58] Field of Search ................. 252/403, 300; 424/59; 260/45.9 R, 823, 857 PE, 873, 857 UN, 45.85 A, 45.85 N; 560/48

[56] References Cited

U.S. PATENT DOCUMENTS

| 3,529,982 | 9/1970 | Luethi et al. | 252/300 UO |
| 3,542,573 | 11/1970 | Biland et al. | 252/300 UO |
| 3,639,249 | 2/1970 | Luethi et al. | 252/300 UO |
| 3,734,884 | 5/1973 | Dunnenberger | 252/403 |
| 3,809,707 | 5/1974 | Havinga et al. | 560/48 |
| 3,870,680 | 3/1975 | Schurdak | 252/401 |
| 3,888,825 | 6/1975 | Schurdak | 252/401 |
| 3,957,851 | 5/1976 | Satzinger et al. | 560/48 |
| 4,021,479 | 5/1977 | Seeger et al. | 560/48 |
| 4,124,768 | 11/1978 | Kirsch et al. | 560/48 |

*Primary Examiner*—Benjamin R. Padgett
*Assistant Examiner*—J. L. Barr
*Attorney, Agent, or Firm*—Connolly and Hutz

[57] ABSTRACT

Polymers comprising terephthalyl-or oxal arylamide groups represent excellent light stabilizers for synthetic, semi-synthetic and/or naturally occurring organic materials.

8 Claims, No Drawings

POLYARYLAMIDE, THEIR PRODUCTION AND THEIR USE AS ABSORBERS FOR ULTRAVIOLET RAYS

This invention relates to polymers containing arylamide groups, to a process for their production and to the use of these substances as absorbers for ultraviolet rays.

It is known that plastics are degraded under the effect of ultraviolet light which is present for example in natural sunlight. This degradation is externally reflected in yellowing of the plastics and is accompanied by a quite serious deterioration in mechanical properties, for example notched impact strength, tensile strength and flexural strength.

There are numerous monomeric UV-absorbers which although imparting greater light stability to polymers, give rise to a number of disadvantages. These disadvantages are in particular the narrow field of application of monomeric UV-absorbers, their inadequate compatibility and their high volatility at the processing temperatures of the plastics. Particular disadvantages of these monomeric UV-absorbers are the fact that, by virtue of their low molecular weight, they are able to migrate from the polymers and the fact that even minor losses are sufficient to result in considerable deterioration in the mechanical properties of most high molecular weight polymers.

It has now been found that polymers containing terephthalyl-or oxalyl-arylamide groups represent excellent light stabilisers for synthetic, semi-synthetic and/or naturally occurring, preferably synthetic and/or semi-synthetic organic materials. They have little or no colour of their own and show high light absorption in the range from 300 to 330 mμ. They can be incorporated surprisingly well into a variety of different polymers and they are not volatile, even at high processing temperatures. They do not exude and have little effect, if any, upon the mechanical properties of the polymers, even when added in relatively large quantities. In order to achieve these effects, molecular weights of about 1000 and higher are generally sufficient for the polymer containing arylamide groups.

Accordingly, the present invention relates to polyterephthalyl-or oxalyl-arylamides corresponding to the formula

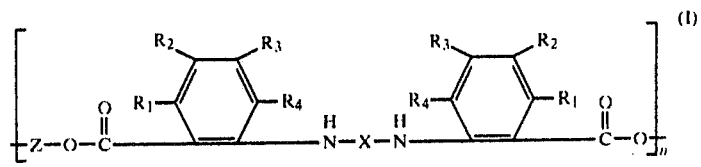

in which
X represents the group

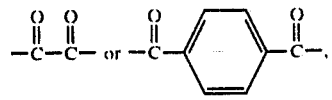

Z represents a straight-chain or branched-chain alkylene radical having 2 to 30 carbon atoms, optionally substituted by chlorine, or a straight-chain or branched-chain alkylene radical having 2 to 35 carbon atoms optionally interrupted by one or more oxygen atoms;

$R_1$ to $R_4$ may be the same or different and represent hydrogen or alkyl radicals with 1 to 4 carbon atoms; and n is a number from 2 to 100, preferably from 2 to 70 and, with particular preference a number from 2 to 55, more especially a number from 2 to 20.

The invention also relates to a process for the production of the poly-terephthalyl-or-oxalyl-arylamides by reacting 1 mol of terephthalic acid, oxalic acid or their derivatives with from 0.8 to 1.2 mols of a compound corresponding to the formula

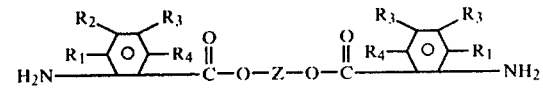

in which $R_1$, $R_2$, $R_3$, $R_4$ and Z are as just defined, either in the presence or absence of inert solvents and/or an inert gas at temperatures in the range from 0° to 170° C. and preferably at temperatures in the range from 20° to 150° C.

The invention also relates to the use of the compounds as absorbers for ultraviolet rays.

The following compounds are mentioned by way of example as compounds corresponding to general formula I above:

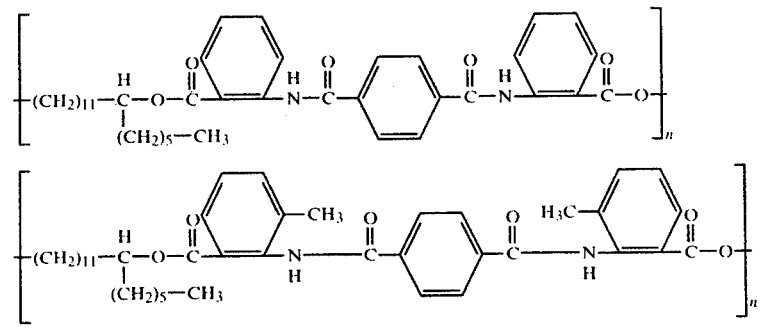

-continued
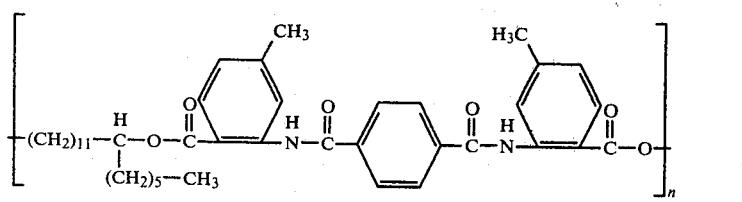
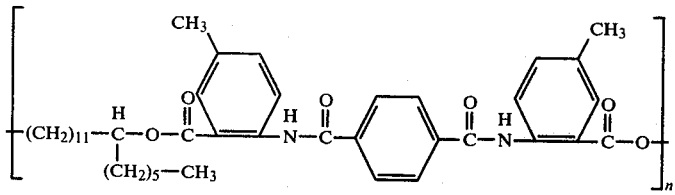
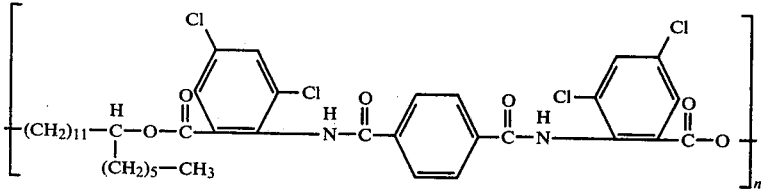
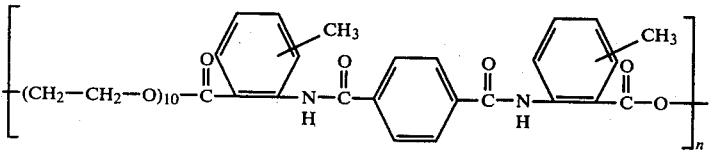
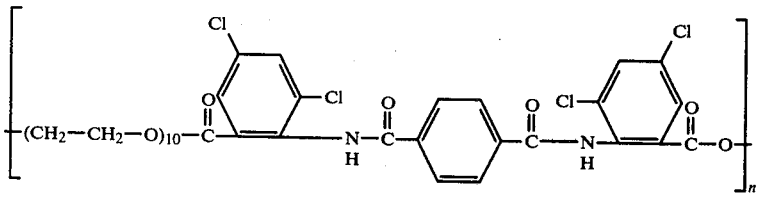
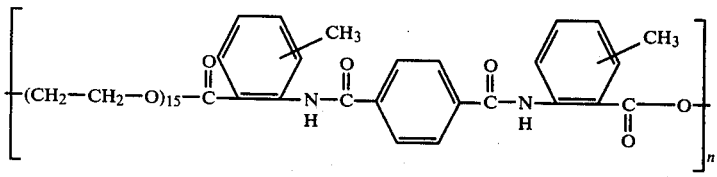
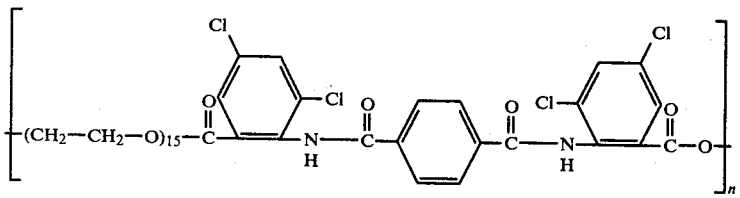
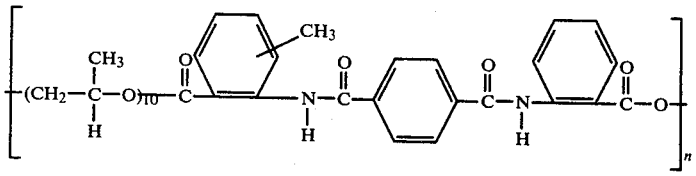
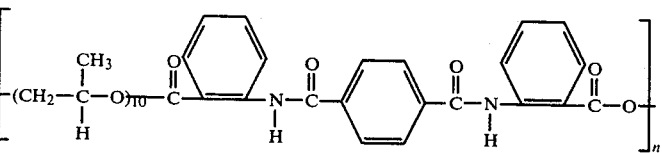

-continued
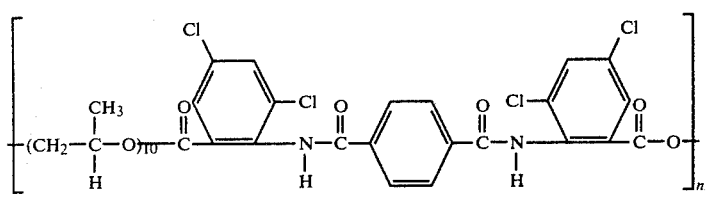
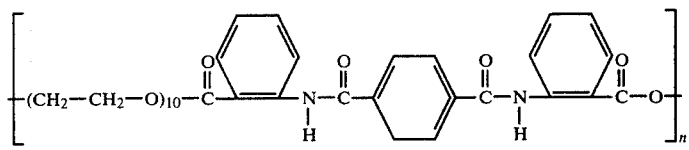
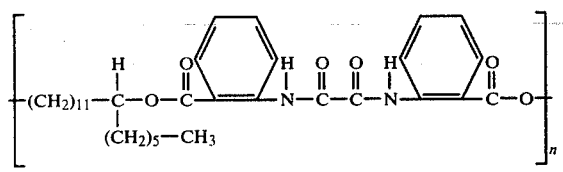
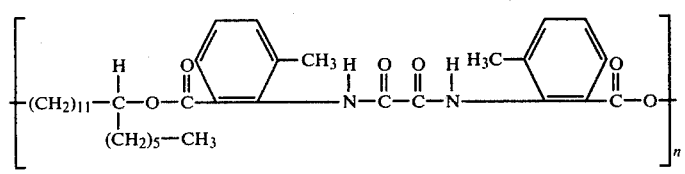
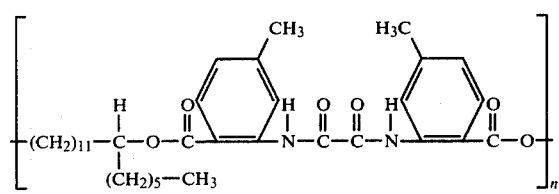
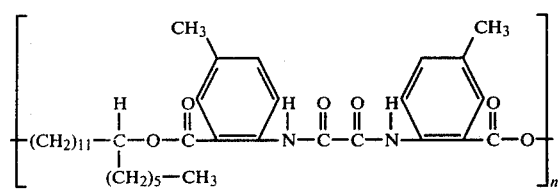
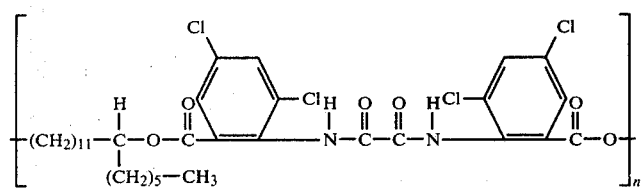
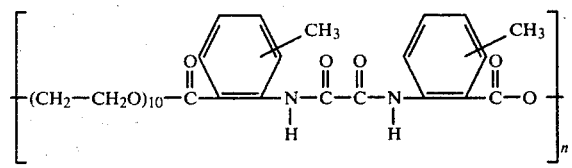
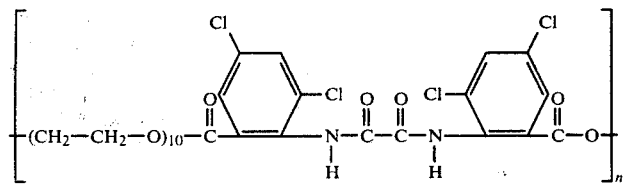

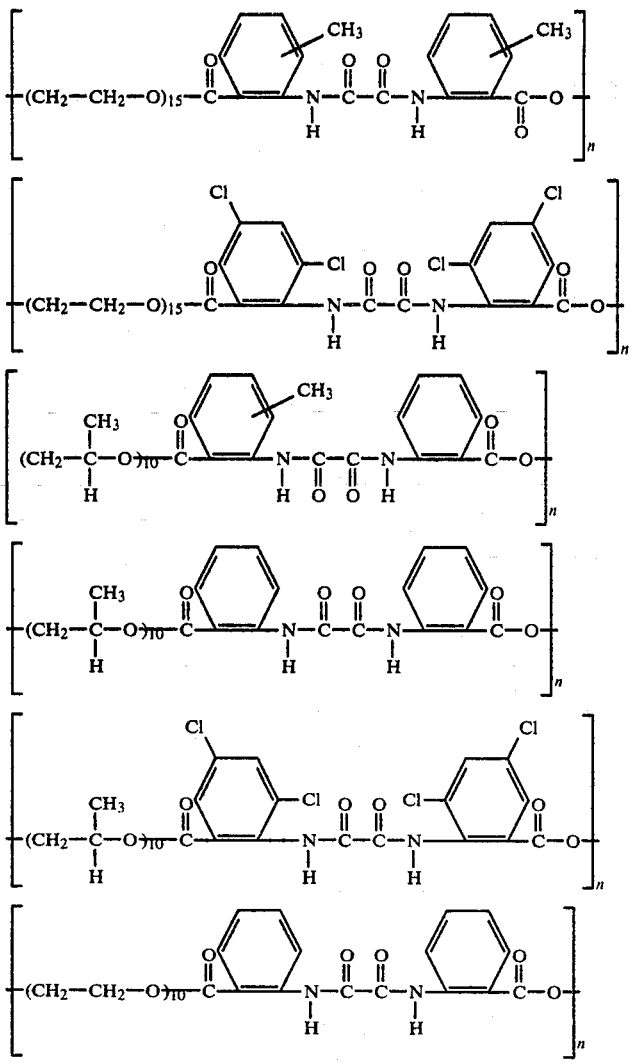

in all these compounds, n is a number from 2 to 100.

Terephthalic acid, oxalic acid or their derivatives, such as $C_1$-$C_4$-esters or acid chlorides, are mentioned as starting materials for the production of the polyterephthalylor-oxal-arylamides.

Suitable inert solvents include aromatic hydrocarbons, such as benzene, toluene, chlorobenzene; aliphatic hydrocarbons, such as ligroin and/or chlorinated hydrocarbons, such as methylene chloride, dichloroethane, carbon tetrachloride and chloroform.

Nitrogen and/or helium may optionally be used as the inert gas.

The compounds are suitable for use as light stabilisers for the following substances:

I. Synthetic organic materials, such as:

(a) Polymerisation products based on organic compounds containing at least one polymerisable carbon-carbon double bond, i.e. their homopolymers or copolymers and their after-treatment products, for example crosslinking, grafting or degradation products, polymer blends, modification products obtained by converting reactive groups in the polymer molecule, etc., for example polymers based on α,β-unsaturated carboxylic acids (for example acrylates, acrylamides, acrylonitrile), on olefin hydrocarbons, for example α-olefins, ethylene, propylene or dienes, i.e. also rubbers and rubber-like polymers (also so-called ABS-polymers), polymers based on vinyl and vinylidene compounds (for example styrene, vinyl esters, vinyl chloride, vinyl alcohol), on halogenated hydrocarbons, on unsaturated aldehydes and ketones and allyl compounds, etc.

(b) Other polymerisation products obtainable, for example, by ring opening, for example polyamides of the polycaprolactam type, also formaldehyde polymers or polymers obtainable both through polyaddition and also through polycondensation, such as polyethers, polythioethers, polyacetals and thioplasts.

(c) Polycondensation products or precondensates based on bifunctional or polyfunctional compounds containing groups capable of condensation, their homocondensation and cocondensation products, also after-treatment products, of which the following are mentioned by way of example: polyesters, saturated (for example polyethylene terephthalate) or unsaturated (for example maleic acid-dialcohol polycondensates and their crosslinking products with polymerisable vinyl monomers), unbranched and branched (also based on higher alcohols, for example, alkyd resins), polyamides (for example hexamethylene diamine adipate), maleate resins, melamine resins, phenolic resins (for example novolaks), aniline resins, furan resins, carbamide resins and also their precondensates and products of similar structure, polycarbonates based on aromatic dihydroxy compounds, silicone resins and the like.

(d) Polyaddition products, such as polyurethanes (crosslinked and uncrosslinked), epoxide resins.

II. Semisynthetic organic materials, for example, cellulose esters and mixed esters (acetate, propionate), nitrocellulose, cellulose ethers, regenerated cellulose (viscose, cuprammonium cellulose) or their after-treatment products, casein plastics.

III. Natural organic materials of animal or vegetable origin, for example based on cellulose or proteins, such as wool, cotton, silk, bast, jute, hemp, skins and hairs, leather, woods in fine distribution, natural resins (such as colophony, more especially lacquer resins), gelatin, glues, also rubber, guttapercha, balata and their after-treatment modification products, degradation products, products obtainable by the modification of reactive groups.

In addition to the compounds of general formula I above, the polymers to be stabilised may contain further additives for example, antioxidants, heat stabilisers, flame proofing agents, antistatics or other already known UV-absorbers. Each of the additives may be added in quantities of from 0.01 to 5% by weight, based on the polymer.

The already known UV-absorbers include, for example, compounds corresponding to the general formaule:

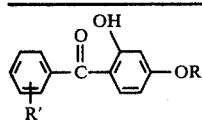

R = H, linear or branched alkyl group having 1 to 12 carbon atoms

R' = H, linear or branched alkyl group having 1 to 12 carbon atoms

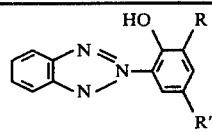

R,R' = linear or branched alkyl group having 1 to 5 carbon atoms

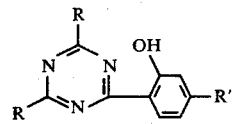

R' = H, alkyl, O-alkyl

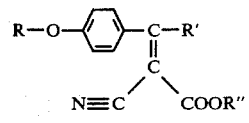

R,R" = linear or branched alkyl group having 1 to carbon atoms

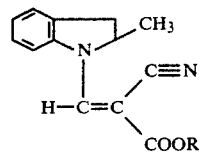

R = linear or branched alkyl group having 1 to 5 carbon atoms

-continued

R' = linear or branched alkyl group having 1 to 5 carbon atoms or 

The polymers according to the invention are added to the materials to be stabilised in such quantities that a light-stabilising effect is obtained. They are preferably added in quantities of from 0.01 to 5% by weight and, with particular preference, in quantities of from 0.01 to 2% by weight, based on the organic materials.

The compounds may be incorporated by conventional methods, for example by:

(1) adding the UV-absorber as such to the polymer melt;
(2) powdering or "spin-coating" the UV-absorber on to the solid plastics material (for example granulate), followed by extrusion at melting temperatures;
(3) adding to suspended or dissolved polymers during their processing;
(4) producing plastics combinations of high UV-absorber content (master batch) and subsequently mixing these concentrates with unstabilised plastic;
(5) preparing solutions or suspensions of the UV-absorber and applying them to the surface of finished plastics articles, the solvent evaporating and the UV-absorber diffusing in high concentration into the surface of the polymer.

The production and application of the compounds corresponding to formula I above is described in the following Examples.

The invention is illustrated by, but by no means limited to, the following Examples.

EXAMPLE 1

Production of polymeric UV-absorbers 15 g of a 20% sodium methylate solution were added to 2.0 mols of anthranilic acid methyl ester and 1.0 mol of octadecane-1,12-diol, followed by heating under nitrogen over a period of 5 hours to an ultimate temperature of 140° C. The methanol distilled off slowly. The residual anthranilic acid methyl ester was then distilled off in vacuo from the product sump. A slowly solidifying diamine was obtained, of which 0.1 mol was dissolved with 22.2 g of triethyl amine in 150 g of benzene. This was followed by the gradual addition under nitrogen of a solution of 20.3 g of terephthalic acid dichloride in 150 g of benzene. On completion of the addition, the mixture was left reacting for 30 minutes, followed by the addition of 1.6 g of acetyl chloride. The reaction product was then washed with dilute hydrochloric acid and with water, dried and filtered. The filtrate was concentrated by evaporation to dryness and dissolved in 120 g of methylene chloride. The polyester amide was precipitated from this solution by the addition of 250 g of methanol. 42 g of a syrupy product corresponding to formula I in Table A were obtained after decantation and drying.

The compounds identified in the following Table were produced in exactly the same way. The substances obtained, corresponding to formula I, and the yields obtained are shown in Table A.

TABLE A $$\left[-Z-O-\overset{O}{\underset{\|}{C}}-\underset{R_4}{\overset{R_2\ R_3}{\bigodot}}R_1-\overset{H}{\underset{|}{N}}-\overset{O}{\underset{\|}{C}}-\bigodot-\overset{O}{\underset{\|}{C}}-\overset{H}{\underset{|}{N}}-\underset{R_4}{\overset{R_3\ R_2}{\bigodot}}R_1-\overset{O}{\underset{\|}{C}}-O-\right]_n \quad (I)$$

| Example | R₁ | R₂ | R₃ | R₄ | Z | Yield |
|---|---|---|---|---|---|---|
| 1 | H | H | H | H | —CH—(CH₂)₁₁—<br>   \|<br>(CH₂)₅—CH₃ | 42 g |
| 2 | H | H | H | H | —CH₂—CH₂—O—CH₂—CH₂— | 48 g |
| 3 | H | H | H | H | —(CH₂CH₂—O—)₉CH₂CH₂— | 35 g |
| 4 | H | H | H | —CH₃ | —CH—(CH₂)₁₁—<br>   \|<br>(CH₂)₅CH₃ | 35 g |
| 5 | H | H | CH₃ | H | —CH—(CH₂)₁₁—<br>   \|<br>(CH₂)₅CH₃ | 32 g |
| 6 | H | CH₃ | H | H | —CH—(CH₂)₁₁—<br>   \|<br>(CH₂)₅—CH₃ | 35 g |
| 7 | H | CH₃ | H | H | —(CH₂CH₂—O—)₉CH₂CH₂— | 33 g |
| 8 | H | Cl | H | Cl | —CH—(CH₂)₁₁—<br>   \|<br>(CH₂)₅CH₃ | 34.5 g |

EXAMPLE 9

Stabilisation of polycarbonate

Separate quantities of 23 g of polycarbonate based on bisphenol A with a viscosity $\eta_{rel}$ of 1.278 were dissolved with 115 mg of the UV-stabilisers (1) and (3) identified in Table A to form 100 g solutions in methylene chloride. The solutions were degassed and then cast into liquid films approximately 250μ thick. Polycarbonate films with a layer thickness of approximately 50μ were left after drying. The films thus stabilised were then irradiated for three hours with a high-pressure mercury vapour lamp on an optical bench (accelerated test). The distance between the lamp and the film was 70 cm. An unstabilised film produced by the same process was irradiated under the same conditions. The unstabilised film had turned distinctly brown in colour after 3 hours' irradiation, whereas the stabilised films still had the same colour as the non-irradiated materials after 3 hours' irradiation.

EXAMPLE 10

Stabilisation of polyamide 0.5% of UV-absorbers (1) and (3) of Table A were worked into caprolactam-based polyamide at 250° C. Blown films approximately 30μ thick were produced from the polyamide thus stabilised. The films obtained were colourless and were irradiated in the same way as described in Example 9. After irradiation for 3 hours, an unstabilised film was clearly discoloured, whilst the stabilised films remained substantially non-discoloured.

EXAMPLE 11

Stabilisation of unsaturated polyester 0.3% by weight of the polymeric UV-absorber (1) in Table A was added to an unsaturated polyester of the following composition:
79.8 parts of propylene glycol,
81.4 parts of phthalic acid anhydride and
44.1 parts of maleic acid anhydride (dissolved to form a 65% solution in styrene)
followed by processing into cast sheets with a thickness of 2 mm. These sheets were weathered for 1000 hours in a xenon Weather-O-Meter (102:19; Pyrexfilter). The spectral colour density Pc of the samples was determined before and after weathering as a measure of yellowing. At the same time, the unstabilised polyester was weathered and measured.

| Result:<br>Sample | Pc unweathered | Pc after 1000 hours'<br>Weather-C-Meter |
|---|---|---|
| no addition | 0.0166 | 0.130 |
| 0.5% by weight | 0.0165 | 0.038 |

It can be seen that, where the polymeric UV-absorber according to the invention was used, the polyester underwent far less yellowing.

EXAMPLE 12

Stabilisation of soft polyvinyl chloride 70 parts of suspension PVC with a K-value of 70 were thoroughly mixed with 30 parts of the plasticiser dioctyl phthalate, 1.5 parts of a Ba-Cd heat stabiliser (Irgastab BC 26) and 0.205 part of the UV absorber (1) in Table A, followed by rolling for 10 minutes at 170° C. into an approximately 200μ thick film. The spectral colour density Pc of the samples was determined both before and after 1000 hours' weathering in a xenon Weather-O-Meter(102:18; Pyrexfilter). A non-light stabilised soft polyvinyl chloride was weathered and measured for comparison.

| Result:<br>Sample | Pc unweathered | Pc after 1000 hours'<br>Weather-O-Meter |
|---|---|---|
| no addition | 0.0113 | 0.031 |
| 0.2% by weight<br>of (II) | 0.0111 | 0.026 |

EXAMPLE 13

Production of polymeric UV-absorbers 15 g of a 20% sodium methylate solution were added to 2.0 mols of anthranilic acid methyl ester and 1.0 mol of octadecane-1,12-diol, followed by heating under nitrogen for 5 hours to an ultimate temperature of 140° C. The methanol distilled off slowly. The residual anthranilic acid methyl ester was then distilled off in vacuo, from the product sump. A slowly solidifying diamine was obtained, of which 0.1 mol was dissolved with 22.2 g of triethylamine in 150 g of benzene. This was followed by the gradual addition under nitrogen of a solution of 12.7 g of oxalic acid dichloride in 150 g of benzene. On completion of the addition, the mixture was left to react for 30 minutes, followed by the addition of 1.6 g of acetyl chloride. The reaction mixture was then washed with dilute hydrochloric acid and with water, dried and filtered. The filtrate was concentrated by evaporation to dryness and dissolved in 120 g of methylene chloride. The polyester amide was precipitated from this solution by the addition of 250 g of methanol. 35 g of a syrupy product corresponding to formula I in Table B were obtained after decantation and drying.

The compounds identified in Table B below were produced in exactly the same way. The substances obtained, which correspond to formula I, and the yields obtained are set out in Table B.

had the same colour as the non-irradiated materials after 3 hours' irradiation.

EXAMPLE 23

Stabilisation of polyamide 0.5% of UV-absorbers (14) and (16) in Table B were worked into caprolactam-based polyamide at 250° C. Blown films approximately 30μ thick were produced from this stabilised polyamide. The films produced were colourless and were irradiated in the same way as described in Example 22. After 3 hours' irradiation, an unstabilised film was distinctly discoloured, whilst the stabilised films had remained substantially colourless.

EXAMPLE 24

Stabilisation of unsaturated polyester 0.3% by weight of the polymeric UV-absorber (14) in Table B was added to an unsaturated polyester of the following composition:
  79.8 parts of propylene glycol,
  81.4 parts of phthalic acid anhydride and
  44.1 parts of maleic acid anhydride (dissolved to form a 65% solution in styrene)

TABLE B $$\left[ -Z-O-\underset{\underset{O}{\|}}{C} - \underset{R_1}{\overset{R_2}{\diagup}}\hspace{-0.3em}\underset{}{\overset{R_3}{\bigcirc}}\hspace{-0.3em}\underset{}{\overset{R_4}{\diagdown}} - NH - \underset{\underset{O}{\|}}{C} - \underset{\underset{O}{\|}}{C} - NH - \underset{R_4}{\overset{R_3}{\diagup}}\hspace{-0.3em}\underset{}{\overset{R_2}{\bigcirc}}\hspace{-0.3em}\underset{}{\overset{R_1}{\diagdown}} - \underset{\underset{O}{\|}}{C} - O - \right]_n \quad (I)$$

| Example | $R_1$ | $R_2$ | $R_3$ | $R_4$ | Z | Yield |
|---|---|---|---|---|---|---|
| 14 | H | H | H | H | $-CH-(CH_2)_{11}-$ <br> $\|$ <br> $(CH_2)_5-CH_3$ | 35 g |
| 15 | H | H | H | H | $-CH_2-CH_2-O-CH_2-CH_2-$ | 25 g |
| 16 | H | H | H | H | $-(CH_2CH_2-O-)_9CH_2CH_2-$ | 32 g |
| 17 | H | H | H | $-CH_3$ | $-CH-(CH_2)_{11}-$ <br> $\|$ <br> $(CH_2)_5CH_3$ | 26 g |
| 18 | H | H | $CH_3$ | H | $-CH-(CH_2)_{11}-$ <br> $\|$ <br> $(CH_2)_5CH_3$ | 30 g |
| 19 | H | $CH_3$ | H | H | $-CH-(CH_2)_{11}$ <br> $\|$ <br> $(CH_2)_5-CH_3$ | 33 g |
| 20 | H | $CH_3$ | H | H | $-(CH_2CH_2-O-)_9CH_2CH_2-$ | 31 g |
| 21 | H | Cl | H | Cl | $-CH-(CH_2)_{11}-$ <br> $\|$ <br> $(CH_2)_5CH_3$ | 30.6 g |

EXAMPLE 22

Stabilisation of polycarbonate

Quantities of 23 g of polycarbonate based on bisphenol A with a viscosity $\eta_{rel}$ of 1.278 were separately dissolved with 115 mg of UV-stabilisers (14) and (16) identified in Table B to form 100 g solutions in methylene chloride. The two solutions were degassed and then cast into liquid films approximately 250μ thick. Polycarbonate films approximately 50μ thick were left after drying. The films thus stabilised were irradiated for 3 hours with a high-pressure mercury vapour lamp on an optical bench (accelerated test). The distance between the lamp and the film was 70 cm. An unstabilised film produced by the same process was irradiated under the same conditions. It was found that the unstabilised film had turned distinctly brown in colour after 3 hours' irradiation, whilst the stabilised films still followed by processing into cast sheets with a thickness of 2 mm. These sheets were weathered for 1000 hours in a xenon Weather-O-Meter (102:19; Pyrexfilter). The spectral colour density Pc of the samples was determined before and after weathering as a measure of yellowing. At the same time, the unstabilised polyester was weathered and measured.

| Result: Sample | Pc unweathered | Pc after 1000 hours' Weather-O-Meter |
|---|---|---|
| No addition | 0.0166 | 0.130 |
| 0.5% by weight | 0.0165 | 0.040 |

It can be seen that, where the polymeric UV absorber according to the invention is used, the polyester undergoes far less yellowing.

EXAMPLE 25

Stabilisation of soft polyvinyl chloride 70 parts of suspension PVC with a K-value of 70 were thoroughly mixed with 30 parts of the plasticiser dioctylphthalate, 1.5 parts of a Ba-Cd heat stabiliser (Irgastab BC 26) and 0.205 parts of the UV-absorber (14) of Table B, followed by rolling for 10 minutes at 170° C. to form an approximately 200μ thick film. The spectral colour density Pc of the samples was determined before and after 1000 hours in a xenon Weather-O-Meter (102:18; Pyrexfilter). A non-light-stabilised soft polyvinyl chloride was weathered and measured for comparison.

| Result: Sample | Pc unweathered | Pc after 1000 hours' Weather-O-Meter |
| --- | --- | --- |
| No addition | 0.0113 | 0.031 |
| 0.2% by weight of (II) | 0.0111 | 0.025 |

We claim:

1. UV-absorbers corresponding to the formula

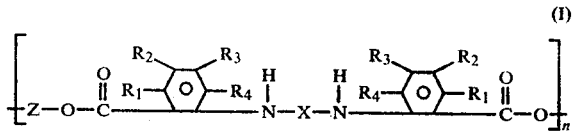

(I)

in which

X represents the group

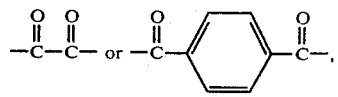

Z represents a straight-chain or branched chain alkylene radical having 2 to 30 carbon atoms, optionally substituted by chlorine, or a straight-chain or branched chain alkylene radical having 2 to 35 carbon atoms interrupted by one or more oxygen atoms, $R_1$ to $R_4$ are the same or different and represent hydrogen or alkyl groups having 1 to 4 carbon atoms, and n is a number from 2 to 100.

2. A process for the production of the compounds claimed in claim 1, wherein 0.8 to 1.2 mol of a compound corresponding to the formula

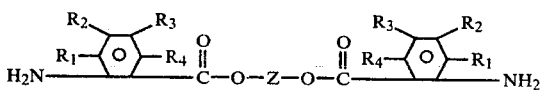

in which $R_1$, $R_2$, $R_3$, $R_4$ and Z are as defined in claim 1, is reacted with one mol of terephthalic acid, oxalic acid or their derivatives at a temperature in the range from 0° to 170° C.

3. A process for stabilizing an organic material wherein a UV-stabilizing amount of a compound of formula (I) of claim 1 is added to the organic material.

4. The process of claim 3 wherein the compound of formula (I) is added in an amount of from 0.01 to 5% by weight, based on the organic material to be stabilized.

5. An organic material stabilized by the process of claim 3.

6. The UV-absorbers of claim 1 wherein n is 2 to 70.
7. The UV-absorbers of claim 1 wherein n is 2 to 55.
8. The UV-absorbers of claim 1 wherein n is 2 to 30.

* * * * *

UNITED STATES PATENT AND TRADEMARK OFFICE
CERTIFICATE OF CORRECTION

PATENT NO. : 4,238,351
DATED : December 9, 1980
INVENTOR(S) : Alfes et al

It is certified that error appears in the above-identified patent and that said Letters Patent are hereby corrected as shown below:

In the naming of the inventors, "Jacob" should read --Jakob--.

Signed and Sealed this

Twenty-first Day of April 1981

[SEAL]

Attest:

RENE D. TEGTMEYER

Attesting Officer

Acting Commissioner of Patents and Trademarks